United States Patent [19]

Kovacs et al.

[11] 4,444,166

[45] Apr. 24, 1984

[54] METHOD AND APPARATUS FOR REDUCING THE OPERATING COMPRESSION RATIOS OF COMPRESSION IGNITION ENGINES

[75] Inventors: Geza Kovacs; Mihaly Kovacs; Endre Kovacs; Peter Kovacs, all of Plant City, Fla.

[73] Assignee: Kovacs Research Center, Inc., Plant City, Fla.

[21] Appl. No.: 472,317

[22] Filed: Mar. 4, 1983

Related U.S. Application Data

[63] Continuation-in-part of Ser. No. 274,134, Jun. 16, 1981, abandoned.

[51] Int. Cl.³ .......................... F02B 3/00; F02B 33/00
[52] U.S. Cl. ........................... 123/262; 123/298; 123/305; 123/281; 123/279; 123/275; 123/276; 123/273; 123/268; 123/259; 123/256; 123/254; 123/1 A; 123/143 A; 123/286
[58] Field of Search ........... 123/143 A, 143 B, 145 R, 123/1 A, 251, 252, 263, 268, 279, 280, 284, 286, 293, 298, 305

[56] References Cited

U.S. PATENT DOCUMENTS

| | | | |
|---|---|---|---|
| 383,510 | 5/1943 | Pischinger et al. | 123/263 |
| 562,720 | 6/1896 | Gardner | 123/145 R |
| 668,839 | 2/1904 | Macomber | 123/145 R |
| 762,960 | 6/1904 | Tuck | 123/263 |
| 855,442 | 6/1907 | Bickerton | 123/145 R |
| 1,546,836 | 7/1925 | Hunt | 123/263 |
| 1,619,825 | 3/1927 | Lucke | 123/263 |
| 1,644,517 | 10/1927 | Eiermann | 123/263 |
| 2,003,311 | 6/1935 | Ricardo | 123/263 |
| 2,065,025 | 12/1936 | Ricardo | 123/263 |
| 2,089,577 | 8/1937 | Sanders | 123/276 |
| 2,118,058 | 5/1938 | Riley | 123/263 |
| 2,118,341 | 5/1938 | Colell | 123/263 |
| 2,133,478 | 10/1938 | Schlaefke | 123/263 |
| 2,185,918 | 1/1940 | Koch | 123/276 |
| 2,187,857 | 1/1940 | Kammer | 123/263 |
| 2,223,090 | 11/1940 | Boxan | 123/276 |
| 2,271,606 | 2/1942 | Sheppard | 123/276 |
| 2,324,328 | 7/1943 | Sheppard | 123/286 |
| 2,505,999 | 5/1950 | Smith | 123/268 |
| 2,685,869 | 8/1954 | Fenney et al. | 123/263 |
| 2,696,199 | 12/1954 | Schmidt et al. | 123/276 |
| 2,741,229 | 4/1956 | Stump | 123/276 |
| 2,766,738 | 10/1956 | Hoffman | 123/262 |
| 2,804,858 | 10/1957 | Schilling | 123/262 |
| 2,855,907 | 10/1958 | Meuper | 123/284 |
| 2,855,908 | 10/1958 | Pflaum | 123/276 |
| 2,935,054 | 5/1960 | Franke et al. | 123/263 |
| 3,044,454 | 7/1962 | Sutton | 123/263 |
| 3,053,238 | 9/1962 | Meurer | 123/263 |
| 3,127,878 | 4/1964 | Leunig et al. | 123/263 |
| 3,179,091 | 4/1965 | Leunig | 123/263 |
| 3,220,389 | 11/1965 | Van Rinsum et al. | 123/276 |
| 3,263,659 | 8/1966 | Francois | 123/268 |
| 3,304,922 | 2/1967 | Hideg | 123/263 |
| 3,456,627 | 7/1969 | Spiers et al. | 123/263 |
| 3,954,093 | 5/1976 | Hughes | 123/143 A |
| 3,960,119 | 6/1976 | Dimitralopoulos | 123/268 |
| 4,006,720 | 2/1977 | Sato et al. | 123/263 |
| 4,038,952 | 8/1977 | Nagano | 123/263 |
| 4,174,679 | 11/1979 | Noguchi | 123/268 |
| 4,186,692 | 2/1980 | Kawamura | 123/263 |
| 4,305,357 | 12/1981 | Scherenberg | 123/263 |
| 4,327,681 | 5/1982 | Latsch | 123/263 |
| 4,332,224 | 6/1982 | Latsch | 123/263 |
| 4,395,983 | 8/1983 | Hamai | 123/263 |

OTHER PUBLICATIONS

Alcohols as Motor Fuels, Society of Automotive Engineers, "Surface Ignition Initiated Combustion of Alcohol in Diesel Engines-A New Approach," 1980, pp. 317-328.

*Primary Examiner*—Ronald B. Cox
*Attorney, Agent, or Firm*—Dowell & Dowell

[57] ABSTRACT

A method and apparatus for combusting diesel, gasoline, kerosene, alcohol and other compression ignition fuels in either direct or indirect injection compression auto ignition internal combustion engines which enables such engines to operate at low compressions. The apparatus includes an ignition chamber which functions to receive a portion of the incoming fuel charge thereby concentrating such portion in an area separate from the auxiliary or primary combustion chambers. The ignition chamber is predominantly in convective heat exchange relationship with the primary combustion chamber and has at least one opening therein designed and oriented with respect to the interior thereof to create a nonturbulent circular air flow therein during the compression stroke of the engine which will cause the lighter components of the fuel charge directed therein to be concentrated adjacent a central zone where such lighter and generally more volatile components of the fuel charge will be ignited by the heat therein to thereby initiate a controlled ignition of the remaining fuel in the ignition chamber. The amount of fuel in the fuel charge directed into the ignition chamber will remain generally constant regardless of the load on the engine and its operating speed with the amount of such fuel charge depending on the engine compression ratio and the relative sizes of the ignition and combustion chambers. The amount of such a fuel charge should be as great as possible while still insuring complete fuel combustion therein. The amount of heat released within the ignition chamber compensates for the heat lost through operating a lower compressions and is sufficient to ignite the fuel in the main burning or combustion chamber.

21 Claims, 7 Drawing Figures

METHOD AND APPARATUS FOR REDUCING THE OPERATING COMPRESSION RATIOS OF COMPRESSION IGNITION ENGINES

CROSS-REFERENCE TO RELATED APPLICATIONS

This application is a continuation-in-part application of U.S. patent application Ser. No. 274,134, filed June 16, 1981, now abandoned and entitled Ignition Chamber For Low Compression Auto Ignition Internal Combustion Engine Using Low Cetane Fuels.

TECHNICAL FIELD

This invention relates generally to direct or indirect compression ignition internal combustion engines and particularly to a method of injecting fuel both into the engine combustion chamber and an ignition chamber which is mounted in open communication with the combustion chamber. The controlled fuel injection together with the ignition chamber enables diesel, gasoline, kerosene as well as low cetane fuels such as substantially pure commercial grade alcohols to be auto ignited at relatively low compression ratios without the requirement of external sources of heat or chemical fuel ignition accelerators once the engine has achieved operating temperature.

BACKGROUND ART

Traditionally in the operation of diesel engines it has been necessary to develop a sufficiently high enough compression within the engine's combustion chamber to generate the heat necessary to vaporize and ignite the fuel charge. In order to reduce the compression within the combustion chamber, use has been made of supplemental electrical fuel heaters, ignitors, or chemical combustion accelerators. Generally, diesel engines are operated at compression ratios of between approximately 16:1 to generally 23:1 using standard diesel fuels with greater compression ratios being necessary to combust lower cetane fuels.

Continuing efforts are being made to develop effective means for reducing the necessity for high compressions in diesel engines in order to save both in engine efficiency as well as to make such engines more reliable and longer lasting. As the compression ratio is decreased in a diesel engine, both the costs and maintenance are decreased.

Although some efforts have been made to reduce the operating compression ratios of diesel engines below 16:1, such efforts have generally required that the fuel charges be either preheated, subjected to supplemental heating within the combustion chamber, ignited such as by use of a glow plug or blended with costly more volatile chemical fuel additives which will ignite at lower temperatures.

In addition to the foregoing problems associated with the auto combustion of diesel, kerosene, gasoline and alcohol fuels, it is also necessary to maximize the efficiency of compression ignition engines so as to conserve fuel while obtaining optimum engine performance. There has been a great deal of effort directed to modifying the primary and supplemental combustion chamber designs as well as modifying other components of diesel engines in order to effect a complete mixing of fuel charges to promote more efficient ignition and thorough burning of the fuel. However, due to the need to achieve high ignition temperatures through compression of the air in the cylinder, together with the heat loss characteristics of prior art compression ignition systems, it has not been possible to auto combust such fuels at lower compression ratios without providing supplemental energy input or more expensive fuel ignition additives.

DISCLOSURE OF THE INVENTION

The present invention is embodied in a method and apparatus for reducing the operating compressions of standard diesel engines necessary to support auto ignition of hydrocarbon fuels. In the preferred embodiment, the ignition chamber is mounted in such a position as to directly receive a portion of the fuel injected into the engine and is either in direct or indirect communication with the primary combustion chamber. The ignition chamber is provided with a single elongated tapered channel or opening which is arranged generally tangentially of the inner periphery of the ignition chamber and which is located preferably at or near the maximum diameter thereof. The total cross-sectional area of the opening taken along the inner periphery of the chamber should generally be no greater than 5% of the total inner surface area of the ignition chamber.

In another embodiment of the invention the ignition chamber is provided with a plurality of tapered openings or ports which are also arranged generally tangentially of the inner periphery of the ignition chamber and which are primarily located along the area of the maximum diameter thereof. The total cross-sectional area of the ports should also generally not be greater then 5% of the total inner surface area of the ignition chamber. The ignition chambers may be used in both direct and indirect communication with the combustion chamber or indirect communication within an auxiliary combustion chamber which is adjacent to and communicates with the primary combustion chamber.

In all embodiments of the invention, the ignition chamber is secured to the supporting engine surface so that a major portion of the surface thereof is spaced from the adjacent engine surfaces thereby minimizing the conductive heat loss from the ignition chamber while maximizing the convective heat exchange relationship with the surrounding combustion zone. Additionally, the size of each ignition chamber will vary depending upon the engine compression and will increase in size, relative to the combustion chamber, as the compression ratio is lowered.

In all embodiments of the invention, a minor portion of the incoming fuel charge is injected directly through the ports or channels and into the ignition chamber during the end of the compression stroke of the piston. The fuel is accelerated as it is forced into the ignition chamber and vaporized therein as it flows around the inner periphery thereof creating a vortex having a dead air zone centrally thereof. Due to the configuration of the ignition chamber and the configuration and positioning of the ports therein, the lighter fuel components become dissociated from the fuel charge and are concentrated within the central portion of the chamber. These lighter fuel components are auto ignited by the heat within the ignition chamber. This initial ignition releases heat into the main burning chamber thereby compensating for heat lost through lower engine operating compressions and thus causing a substantially spontaneous combustion of the remainder of the fuel charge in the engine's primary combustion chamber.

The amount of fuel injected directly into the ignition chamber will remain relatively constant regardless of the engine operating speed and load with such amount affording the highest concentration of fuel therein which will provide for complete fuel combustion and thus insure that 80%–100% of the available oxygen in the ignition chamber is consumed during each compression stroke.

It is a primary object of this invention to provide an ignition chamber for use in standard compression ignition engines to enable such engines to operate at lower compression ratios using a variety of fuels including diesel, gasoline, kerosene, and commercial grade alcohols and other low cetane fuels without the continuous need for supplemental heat exchange sources such as spark plugs, glow plugs or incandescent and electric heat exchangers and without having to blend the basic fuel charge with more volatile combustion agents or chemical ignition accelerators.

It is another object of this invention to provide an ignition chamber for a direct or indirect injection diesel engine wherein the ignition chamber is designed and constructed so as to cause dissociation of the more volatile lighter fuel components from a portion of the fuel charge received directly therein. The more volatile fuel components will be ignited during the end of the engine's compression stroke by the heat therein even when operating at relatively low compressions.

It is a further object of this invention to provide an ignition chamber for a compression ignition engine wherein the openings or channel between the ignition chamber and the main or a surrounding auxiliary combustion chamber are so positioned as to create an increased acceleration of fluid flow into the ignition chamber during compression so as to collect and concentrate the lighter more volatile fuel particles and gases which are dissociated from the fuel injected therein.

It is another object of this invention to provide an ignition chamber for a compression ignition engine which is in open communication to either the main or an auxiliary combustion chamber by at least one tapered and tangentially oriented opening which is disposed through the side wall of the chamber and in which the maximum area defined by the opening adjacent the inner surface of the chamber generally will not exceed approximately 5% of the total inner surface area thereof.

It is a further object of this invention to maintain the temperature of the ignition chamber at a sufficient level to cause ignition of the fuels injected therein by reducing the amount of conductive heat loss from the ignition chamber to the walls of the engine or engine components. In this regard, preferably 80% or more of the exterior surface of the ignition chamber must be spaced from the adjacent walls of the engine head, auxiliary combustion chamber or piston to which the ignition chamber is mounted so as to be substantially in convective heat exchange relationship to the heated air within the main or auxiliary combustion chamber.

It is yet another object of this invention to provide an ignition chamber which may be mounted within existing direct or indirect injection diesel engines including being mounted to the head, the piston or within an auxiliary combustion chamber to thereby enable such engines to auto combust fuels at lower compressions than would otherwise be possible.

It is another object of this invention to provide a method of injecting fuel into a diesel engine wherein a minor portion of the fuel charge is directed into an area separate from the main or auxiliary combustion chambers wherein such fuel charge is highly concentrated so as to be more easily vaporized and auto ignited by the heat therein even at low engine compressions and wherein the amount of fuel in such minor portion of the fuel charge remains essentially constant regardless of the engine operating speed and load.

It is yet another object of this invention to provide a method of injecting fuel into a diesel engine wherein the fuel charge is divided into first and second portions with the second portion being directed into a separate ignition chamber and wherein the first portion is directed toward the engine's primary combustion chamber. The amount of the second portion of the fuel charge will remain generally constant however the amount of the first portion of the fuel charge will increase as the engine speed and load on the engine increases. The amount of fuel in the second portion of the fuel charge may vary depending upon the desired compression ratio and size of the ignition chamber with the fuel amount being increased as the compression ratio decreases. However, the amount of fuel in the second portion of the fuel charge may not exceed the amount of fuel necessary to operate a given engine at idling speed.

It is also an object of this invention to provide a method for injecting and auto igniting a variety of hydrocarbon fuels including low cetane fuels such as standard commercial grade alcohols including methanols and ethanols in standard diesel engines wherein such engines may be operated at compression ratios of as little as 7:1 using diesel fuels and other fuels having a similar cetane ratings and as little as 10:1 using standard commercial grade alcohols and other low cetane fuels.

BRIEF DESCRIPTION OF THE DRAWINGS

FIG. 6 is a fragmentary sectional view illustrating the preferred form of the invention as mounted in an indirect injection compression ignition engine.

FIG. 7 is a fragmentary sectional view illustrating the preferred form of the invention as mounted in a direct injection compression ignition engine.

BEST MODES FOR CARRYING OUT THE INVENTION

Figure 1:
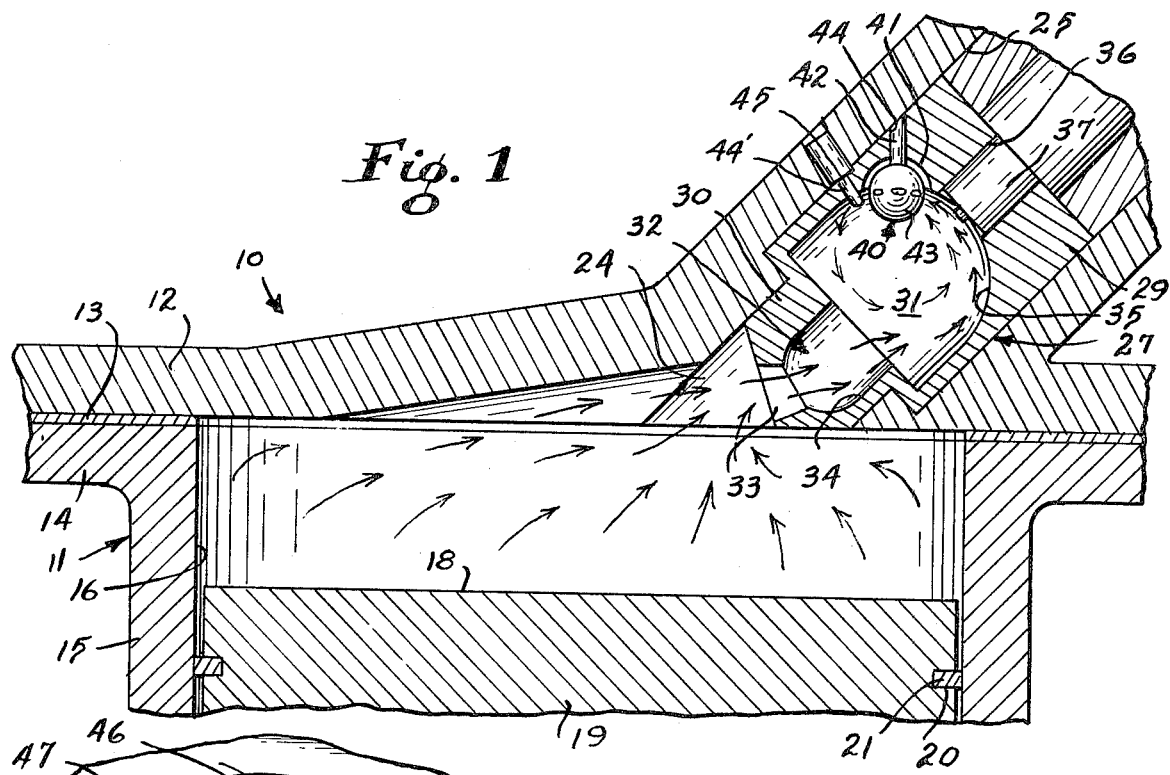
FIG. 1 is a fragmentary sectional view illustrating one form of the invention as mounted within an auxiliary combustion chamber of an indirect injection internal combustion engine.

With continued reference to the drawings, an internal combustion engine 10 is shown which includes an engine block 11 and a head 12. A head gasket 13 is positioned between the head and the block and the head is connected to the block by a plurality of bolts (not shown). The block 11 has an upper wall 14 with at least one cylindrical wall 15 extending downwardly therefrom and the inner periphery of such cylindrical wall defines a relatively smooth axial cylinder bore 16. A piston 17 is slidably mounted within the bore 16 and such piston is connected in a conventional manner (not shown) to a crankshaft by a wrist pin and piston rod. The piston includes an upper portion 18 integrally connected to a depending skirt 19 and such piston is provided with a plurality of annular grooves 20 which receive sealing rings 21 which slidably engage the bore 16 of the cylinder. The central portion of the piston head 18 is shown as being relatively flat, however, it may be provided with one or more recesses as shown in FIGS. 4–7.

The head 12 includes a substantially planar inner wall 23 which is in direct open communication with the cylinder bore 16. A flared or stepped opening 24 is provided through the head 12 so as to be directly above the bore 16 and communicates with a bore 25 which extends outwardly from the cylinder 16. An auxiliary combustion or precombustion chamber housing 27 is mounted within the bore 25 and the stepped opening 24 so as to be in intimate sealed engagement with the adjacent wall portions 28 of the head.

As shown in the drawings, the auxiliary combustion chamber housing 27 includes upper and lower portions 29 and 30 which define a generally hemispherical auxiliary combustion chamber 31 therebetween. The lower portion 30 of the auxiliary combustion chamber housing has a stepped angulated channel 32 therethrough which openly communicates the auxiliary combustion chamber 31 with the main combustion chamber disposed between the upper surface of the piston and the lower wall 23 of the head.

The channel 32 includes an opening or mouth portion 33 and a wider inner passage 34. As shown by the arrows in FIG. 1 the channel 32 directs air flowing into the chamber 31 about the inner periphery thereof which is defined by the arcuate inner wall 35 of the upper portion 29 of the housing 27.

An opening 36 is provided through the center of the upper portion 29 of the auxiliary chamber housing 27 and a fuel injector 37 is mounted therein so as to be generally aligned with the elongated central axis of the auxiliary combustion chamber 31 and the passage 34 of the channel 32. In this manner, fuel being injected through the auxiliary combustion chamber and the channels into the primary combustion chamber will pass either directly through channel opening 33 or be deflected angularly outward between the piston and cylinder head as indicated by the dotted lines in FIG. 2.

As previously discussed, it is the primary purpose of this invention to provide for the low compression auto combustion of diesel and other hydrocarbon fuels which may even include pure commercial grade alcohols. In this regard, it has been determined that if a portion of an injected fuel charge is dissociated to separate the more volatile components therefrom and thereafter the lighter components or gases concentrated in one area, the volatile components can be ignited under controlled conditions at lower temperatures and pressures. Such preliminary or initial ignition can therefore be used to initiate complete combustion of the remainder of the fuel charge.

To affect the concentration of the lighter and more volatile components or gases of the fuel charge and to create residual temperatures which will support ignition of such gases, an ignition chamber 40 is mounted within a semi-spherical opening or pocket 41 in the peripheral side of wall 35 of the auxiliary combustion chamber 31. The ignition chamber 40 includes an elongated base portion 42 and spherical housing 43. The base 42 is securely mounted within a bore 44 through the upper portion 29 of the auxiliary combustion chamber housing 27 so that the spherical housing 43 is disposed outwardly into the auxiliary combustion chamber 31 in spaced relationship with the inner walls 35 thereof. A second bore or opening 44' extends through the upper portion of the auxiliary combustion chamber adjacent the semispherical pocket 41 and such bore receives a glow plug 45 for purposes as will be hereinafter described in greater detail.

Figure 3:
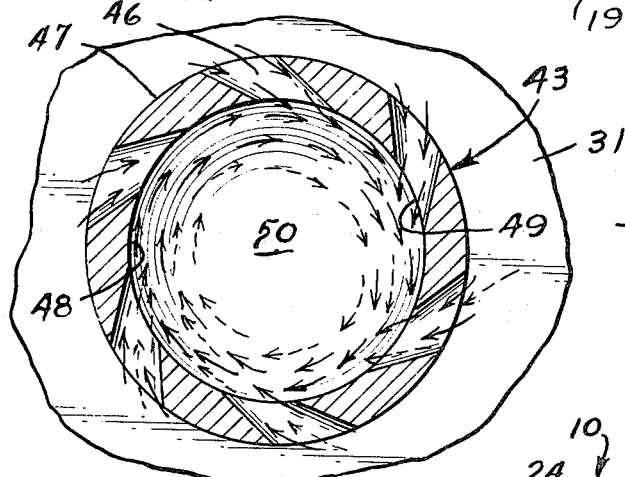
FIG. 3 is an enlarged sectional view taken along line 3—3 of FIG. 2 illustrating the flow within the ignition chamber during compression.
Figure 2:
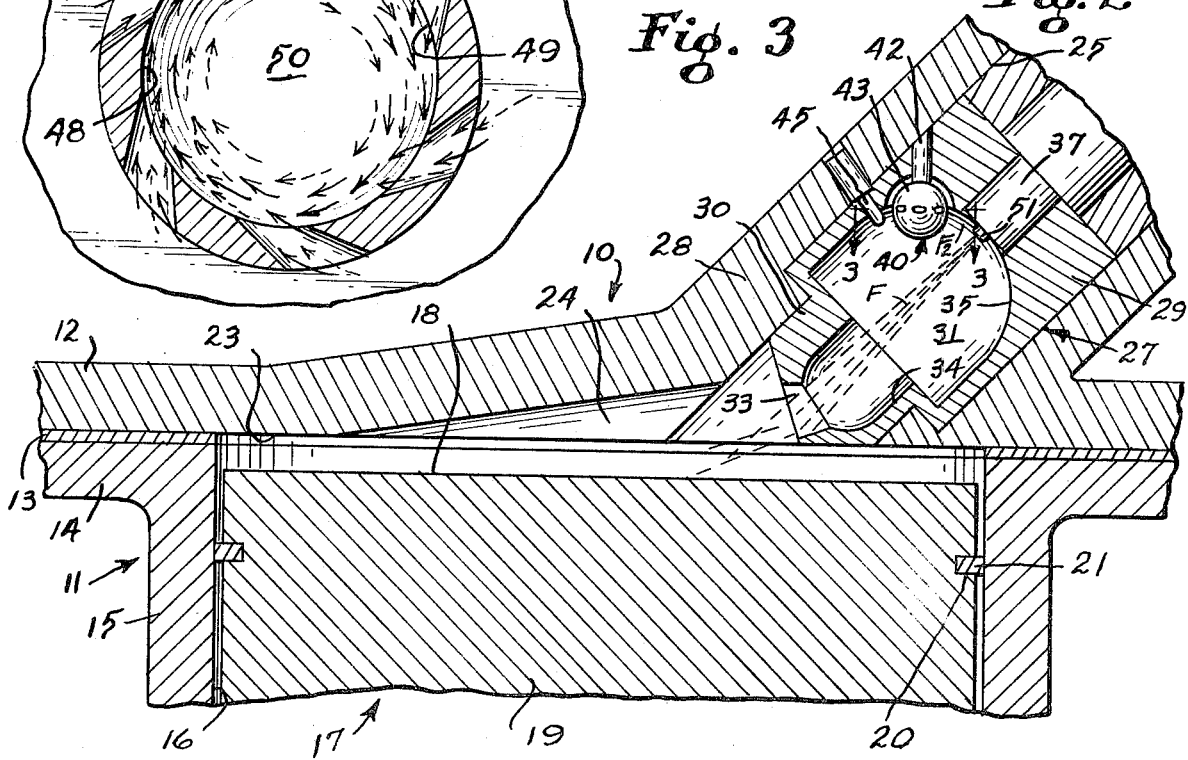
FIG. 2 is an enlarged fragmentary section of the main and auxiliary combustion chambers and ignition chamber of FIG. 1 during fuel injection showing the two separate fuel streams.

With particular reference to the embodiment shown in FIGS. 1–3, the ignition chamber 40 includes a plurality of spaced openings 46 which are tapered inwardly between the outer surface 47 and inner surface 48 of the ignition chamber. The innermost portion 49 of each opening is generally tangentially oriented with respect to the inner surface 48 thereof. It should be noted that the openings 46 lie in substantially the same plane and that such plane should preferably be defined by a line taken through or adjacent the maximum diameter D of the spherical housing 43 of the ignition chamber. As the openings are tapered inwardly between the inner and outer surfaces of the spherical housing with the innermost portion of the openings or ports 49 being oriented so as to be generally tangential to the inner wall 48, the incoming air, fuel and gases are not only accelerated as they enter the ignition chamber, but are also directed along the inner periphery thereof in a circular pattern. Such flow within the ignition chamber will create a vortex having a dead air space 50 along or defining the axis thereof, which axis extends perpendicularly to, and centrally of, the circular flow path.

With respect to the injection of fuel into the combustion zone defined by the main and auxiliary combustion chambers, the injector 37 is designed to separate the injected fuel into two streams. The main stream F is injected directly toward the opening 33 of the channel 32 of the auxiliary combustion chamber housing 27 while a lesser quantity of fuel is simultaneously injected, as shown by stream $F_2$ through one of the openings 46 into the ignition chamber.

The ignition fuel stream $F_2$ will generally always contain the same amount of fuel regardless of the engine speed or the load being placed on the engine. The amount of the fuel in stream $F_2$ will depend upon the desired compression ratio. As the compression ratio is reduced, the amount of heat created by the compression is reduced. Therefore, it has been found that it is necessary to increase the size of the ignition chamber as well as to increase the amount of fuel injection therein in order to maintain sufficiently high residual temperatures to support ignition of the incoming fuel. It is essential, however, that the amount of fuel be sufficient to create the highest concentration of fuel in the ignition chamber as is possible while still achieving complete combustion of such fuel. In this regard, the fuel in the ignition chamber should preferably consume 100% of the available oxygen in the ignition chamber and generally never less than 80% of the available oxygen during combustion. On the other hand, the amount of fuel should not be excessive and should not exceed that quantity which would normally support the operation of the engine at idling speed. The use of quantities of fuel in stream $F_2$ which would exceed the amount of fuel necessary to operate the engine at idling speed will result in excessive fuel consumption, less efficiency in the power stroke and uncontrollable engine operation. It should also be noted that although the quantity of fuel in stream $F_2$ remains essentially constant during engine operation, the quantity of fuel in the main stream F will be varied to compensate for changes in engine speed and load on the engine.

As previously discussed, as fuel is injected into the ignition chamber, the heavier particles of fuel entrained in the air are forced outwardly by centrifugal action while the lighter or less dense particles are collected or concentrated inwardly toward the dead air zone 50. By way of example, when low cetane fuels such as alcohol are injected, the hydrogen dissociates from the alcohol in the ignition chamber, and it is believed that the light hydrogen particles or gases are concentrated adjacent the dead air zone. The concentrated lighter particles and gases adjacent the dead air zone will be subjected to residual temperatures sufficient to cause auto ignition. The initial combustion or initial ignition will in turn cause the remaining fuel from stream F in the auxiliary and main combustion chambers to ignite expanding the gases in these combustion areas and driving the piston downwardly. In this manner, it is possible to obtain a controlled auto combustion of diesel and other hydrocarbon fuels at compression ratios of less than 10:1 in a compression ignition engine.

Figure 5:
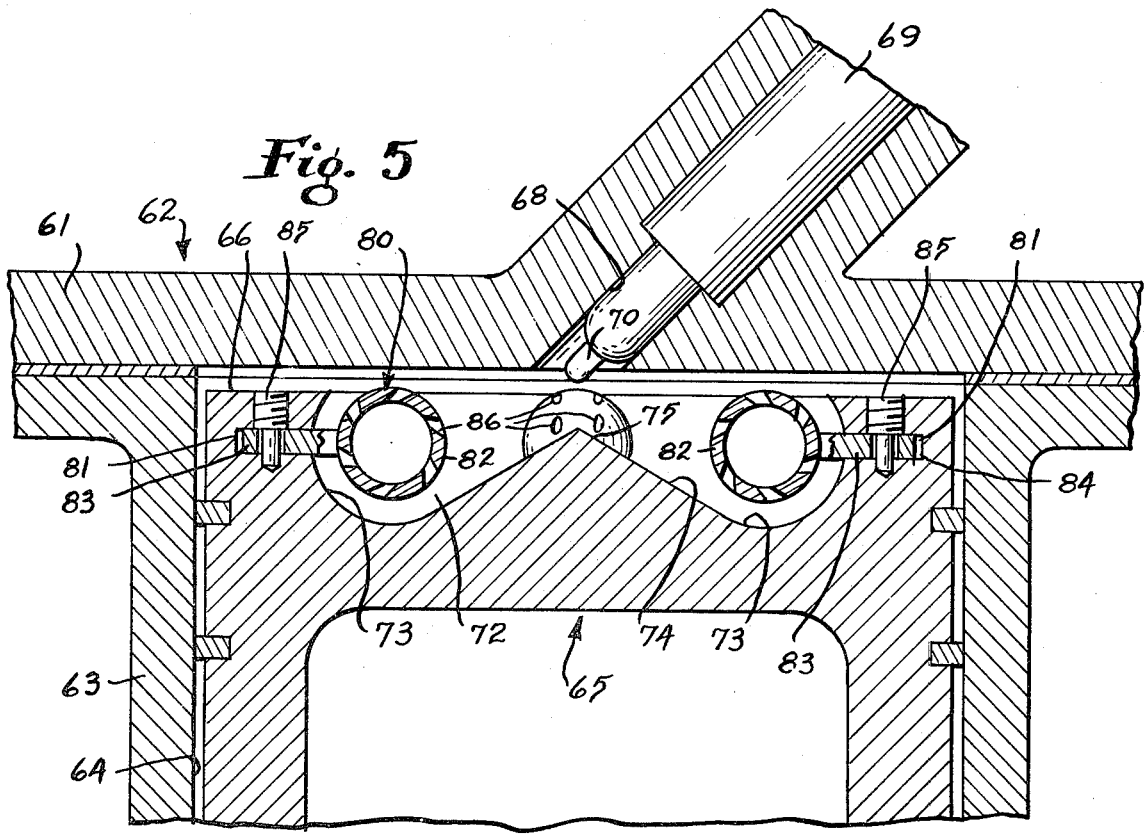
FIG. 5 is a fragmentary sectional view illustrating a modified form of the invention as mounted to the piston of a direct injection compression ignition engine.

Although the embodiment shown in FIGS. 1-3 discloses an ignition chamber having a plurality of generally equally spaced converging or tapered openings 46 arranged in a single row therein, other opening configurations including multiple rows of openings may be used as shown in FIG. 5. If the openings are to be spaced in different planes, they should lie as close as possible to the area or plane defining the maximum diameter D of the housing, thereby generating a maximum circular flow path. In determining what configuration is to be used, it is necessary to insure that the air flow within the housing 43 of the ignition chamber 40 be of a sufficient velocity and in an appropriate pattern to cause the dissociated particles and gases to be collected or concentrated in one area of the ignition chamber. The flow pattern should be nonturbulent within the ignition chamber, therefore no opening should direct the incoming air and fuel through the center of the ignition chamber as this would effectively destroy the centrifugal flow pattern which causes the lighter particles and gases to be collected adjacent the central dead air zone. Preferably, all openings should be oriented in substantially parallel relationship so that the incoming air and fuel are directed in parallel flow paths about a common axis.

In utilizing the spherical ignition chamber, it has been determined that in order to create a sufficient centrifugal velocity within the housing that the number and size of the openings are measured at the innermost portion thereof, as at 49, should generally not exceed a total surface area of greater than 5% of the total inner surface area of the housing 43. In tests made utilizing a modified YSE-12 YANMAR single piston marine diesel engine having a piston diameter of 3.45 inches (87.63 mm), a 3.550 inches (90.17 mm) stroke and a 10 horsepower rating, it was found that although the engine could be operated at higher RPMs, i.e., 2,000 RPM or more, utilizing an ignition chamber housing in which the total opening space was approximately equivalent to 7%-10% of the inner surface area of the ignition chamber, that the same engine could not be operated smoothly at lower RPMs. It is further believed that if the shape of the ignition chamber housing is changed, such as to be providing a cylindrical configuration having openings disposed through the periphery thereof, that the surface area of the openings may be less than 5% of the surface area of the internal surface of the chamber housing.

As the invention is to be utilized to reduce the operating compressions of a diesel engine, the residual temperatures in the ignition chamber must be sufficient to cause auto ignition of the concentrated or collected lighter and more volatile gases at lower compression pressures.

The residual temperature can be raised by increasing the size of the ignition chamber to provide for more heated surface area, increasing the amount of fuel injected into the chamber while optimizing complete burning of the fuel and decreasing the amount of conductive heat loss from the ignition chamber. It should be noted that it is only necessary to retain sufficient temperatures to ignite the more volatile gases collected centrally within the ignition chamber and not the main fuel stream F.

Again, with reference to the embodiment shown in FIGS. 1-3, it can be observed that the exterior surface area available for conductive heat loss to the surrounding engine head has been minimized by providing an elongated base or mounting portion 42. Thus, the majority of the surface area of the ignition chamber is directly exposed to the heated air and gases within the auxiliary combustion chamber 31 and the convective heat loss to the surrounding heated air and gaseous media is less than if a corresponding surface area were in conductive head exchange relationship with the metallic head of the engine. Additionally, it is theorized that the residual temperature in the dead air zone created by the circular flow of air and gas within the ignition chamber is maintained at even a higher elevation than would otherwise be possible if the flow of air and gas were simply turbulent, thereby disrupting any dead air space. In addition to the foregoing, fuel injected into the ignition chamber will tend to cool the housing and in so doing will reduce the damage caused by excessive heat buildup which would shorten the operating life thereof. In practice, it is believed that the temperature within the ignition chamber fluctuates, during engine operation, between approximately 1,000° F.-1,400° F. Due to the high temperature and impacting fuel sprays, the ignition chamber should be manufactured from material which is both resistant to high temperatures and corrosion.

The size of the ignition chamber will vary both with respect to the compression ratio in an engine as well as the type of fuel being injected therein. For example, when combusting a standard diesel fuel in an engine developing a compression ratio of 10:1, it has been determined that the volume defined by or within the ignition chamber should be approximately 15% of the total volume of the combustion zone. If, however, the compression ratio is dropped to 7:1, the volume defined by the ignition chamber should be increased to approximately 20% of the volume of the combustion zone. If the compression ratio is raised say to 14:1, the size of the chamber may be reduced to approximately 5% of the total volume of the combustion zone. If the compression ratio in an engine is increased to 16:1 or greater, the ignition chamber would not be necessary to auto ignite standard diesel fuels, however, this would not be true if low octane fuels such as commercial grade alcohols are being used as the combustion fuel.

When combusting an alcohol such as a substantially pure commercial grade methanol, however, the size of the ignition chamber should be approximately 15% of the volume of the combustion zone if the engine is developing a compression ratio of approximately 20:1. If the compression ratio is lowered to approximately 15:1, the size of the ignition chamber would be increased to approximately 20% of the total volume of the combustion zone.

Figure 4:
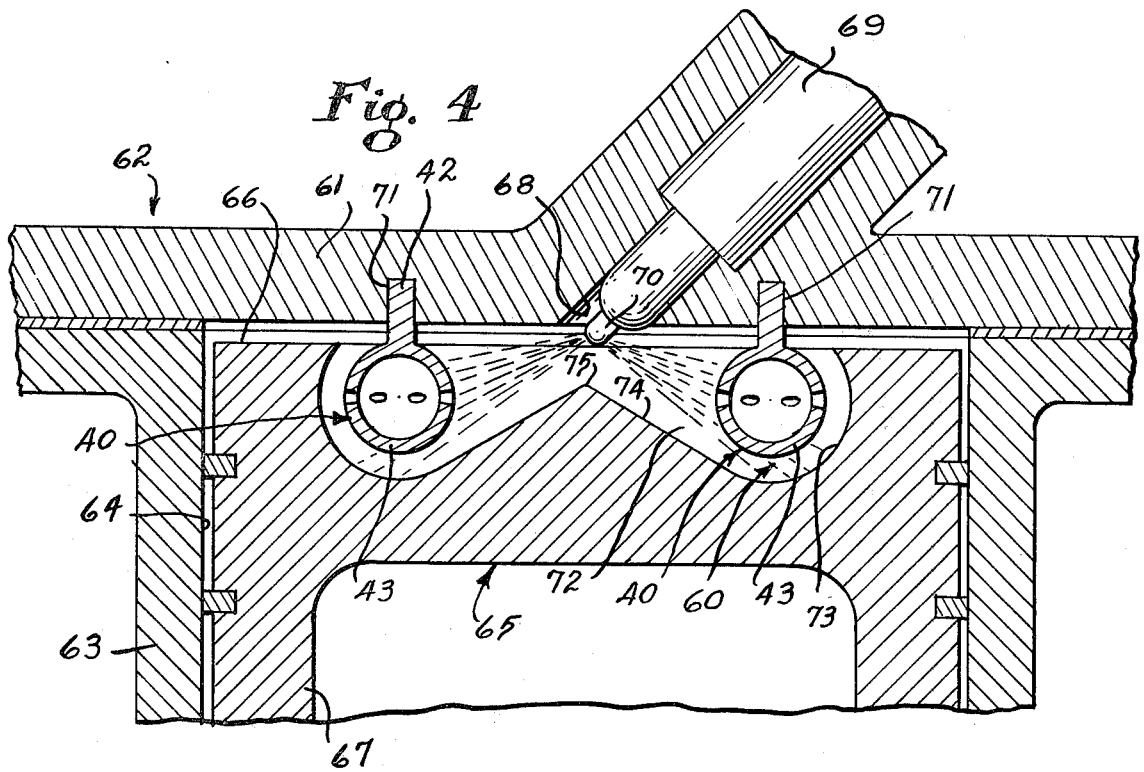
FIG. 4 is a fragmentary sectional view illustrating the invention as mounted to the head of a direct injection compression ignition engine.

The increased area requirement of the ignition chamber as previously discussed may be accomplished by utilizing more than one ignition chamber and by diverting the fuel stream $F_2$ into each ignition chamber. With particular reference to FIG. 4 two ignition chambers 40 are shown as they are mounted to the head 61 of a direct injection type compression ignition engine 62. The ignition chambers are the same as described with respect to FIGS. 1-3 and include the same annularly disposed tapered openings 46.

The direct injection engine 62 includes a cylinder wall 63 defining a bore 64 in which a piston 65 is reciprocally mounted. The piston includes an upper surface 66 and depending skirt portion 67. An opening 68 is provided through the head 61 in which an injector 69 is mounted. The injector includes a nozzle 70 which directs a portion of the fuel charge outwardly toward each of the housings 43 of the ignition chambers 40, the amount of such fuel charge being determined as previously discussed.

As each of the ignition chambers is mounted having its base portions 42 within spaced openings 71 in the head 61, the housings 43 of the ignition chambers will be disposed downwardly towards the upper surface 66 of the piston. In this embodiment, a conventional shaped combustion cavity 72 is provided in the upper portion of the piston. The cavity is defined by arcuately and concavely shaped peripheral walls 73 which are connected along their lowermost portions by a somewhat inverted conical surface 74 which includes an upstanding central tip portion 75. The clearance provided by the peripheral walls 73 of the combustion cavity 72 is sufficient to permit the housings 43 of the ignition chambers to be disposed within the cavity when the piston reaches top dead center position. By utilizing two or more spaced ignition chambers within the combustion zone or cavity, it is possible to create a more even or uniform ignition and subsequent combustion of the fuel charge.

With particular reference to FIG. 5, another modified form of ignition chamber 80 is disclosed. The direct injection engine 62 is the same as that described with respect to FIG. 4 except that the modified ignition chambers are shown as being mounted within openings 81 horizontally disposed in the side or peripheral walls 73 of the combustion cavity 72 formed in the upper portion of the piston 65. Each ignition chamber 80 includes a head or housing portion 82 and a base portion 83. The base portion includes an opening 80 therein by way of which a locking pin 85 may be selectively positioned therethrough to secure the ignition chambers within the openings 81. Each of the ignition chamber housings 82 includes two series of annularly disposed generally equally spaced openings 86 which openings are oriented in two parallel vertical planes, there being twelve such openings shown in each housing. Again, the number of openings and their respective placement may vary as previously discussed. As with the embodiment of FIG. 4, the injector 69 in FIG. 5 includes a nozzle 70 for directing a portion of the fuel spray towards each of the ignition chambers.

Although not shown with respect to FIGS. 4 and 5, a glow plug, similar to that disclosed in FIGS. 1-3 may be provided for use during the initial engine operation. As it is necessary that the residual heat within the ignition chamber be sufficiently high to ignite the lighter particles or gases collected therein, it is only necessary that a supplemental source of heat or chemical accelerator be provided until the engine has reached operating temperature. Thereafter, due to the design characteristics of the present ignition chambers, the temperatures within the dead air zone will be sufficient to cause auto combustion of even low cetaine fuels such as methanols and ethanols at compressions ranging from 10 to 20:1. When diesel and other higher cetane fuels are used, compression ratios may be reduced even further, such as to 7:1.

With particular reference to FIGS. 6 and 7 the preferred embodiment of the invention is disclosed as being mounted for use with indirect and direct injection pressure ignition engines, respectively. Both of the cross sections of FIGS. 6 and 7 disclose a piston 90 which is reciprocally moveable within a cylinder 91. The upper portion of the cylinder is sealed by the head 92 of the engine. Each of the pistons 90 incorporates a contoured face 93 which is shaped so as to distribute the force generated upon ignition across the upper portion of the piston. The indirect injection engine shown in FIG. 6 includes an auxiliary combustion chamber 94 which communicates with the cylinder by way of a passageway 95 formed in the head of the engine.

In both the engines disclosed in FIGS. 6 and 7, a specially modified fuel injector 96 is mounted through the head of the engine and has a nozzle 96' which is substantially flush with the walls defining the combustion zone. The fuel injector distributes the main portion F of the incoming fuel directly towards the combustion zone defined by the open areas between the head and the piston. A minor portion $F_2$ of the incoming fuel charge is directed laterally toward an ignition chamber assembly 98.

The ignition chamber assembly of the preferred embodiment includes a general cylindrical housing 97 which is mounted within an opening through the head of the engine defined by walls 99. The housing is sealed against the exterior portion of the head by an outwardly extending flange portion 100 and is mounted so as to be spaced from the walls 99 defining the opening thereby creating an air gap 101 which extends completely around the housing and which is in open communication with the combustion zone within the auxiliary combustion chamber or the primary combustion chamber as shown in FIGS. 6 and 7. The innermost or end wall 110 of the housing is formed so as to be coextensive and complimentary to the adjacent walls of the engine head.

An ignition chamber 102 is provided within the housing 97 and such chamber is in open communication with the combustion zone by way of an elongated tapered channel 103 which extends from adjacent the nozzle of the fuel injector 95 inwardly toward the peripheral inner walls 104 which define the spherical ignition chamber 102. The channel is reduced in cross section along its length being wider adjacent the combustion zone and tapering and converging inwardly to an opening 105 into the ignition chamber. The channel is oriented so that the opening into the ignition chamber 103 is tangential to the inner peripheral walls 104 of the spherical chamber.

As is shown in the drawings a portion of the head immediately adjacent the injector nozzle may be selectively removed as at 106 in order to provide an unobstructed path through which the minor portion of the fuel stream $F_2$ is directed towards the channel leading to the spherical ignition chamber 102.

An opening 107 is provided axially through the upper portion of the ignition chamber housing 97 and communicates with the ignition chamber 102. A glow plug or similar igniter 108 is selectively received within the opening so that the electrode portion 109 thereof is adjacent to the ignition chamber. As was previously discussed with respect to the other embodiments of the invention, the tapered channel functions to orient the incoming air and fuel charge into a circular flow path within the ignition chamber. As the fuel particles flow in a circular path in the ignition chamber, the lighter more volatile fuel components are concentrated more centrally near a vortex or dead air zone which is created generally perpendicular to the flow. As with the modified form to the invention, the size of the opening 105 into the spherical chamber from the elongated channel should not exceed 5% of the total inner surface area defined by the inner peripheral walls 104 thereof. Additionally, there should be no other opening into the spherical chamber which would permit incoming air to disrupt the nonturbulent and uniform flow of material therein.

As was the case with the modified forms of the invention, the ignition chamber housing is spaced from the adjacent walls of the head so that the air pocket therebetween prevents conductive heat loss from the housing into the head. Further, the amount of fuel in the minor fuel stream $F_2$ will vary depending upon the compression ratio at which it is desired to operate the engine as the amount of heat released within the ignition chamber must compensate for the heat lost through operating the engine at lower compressions. Likewise the size of the ignition chamber will be dependent upon the engine compression ratio. As the compression ratio is lowered, both the size of the spherical ignition chamber and the amount of fuel in the minor or partial fuel stream $F_2$ are increased.

The glow plug or other igniter is provided only for use during the initial engine operation. Due to the design characteristics of the ignition chamber the temperature maintained within the dead air zone created therein will be sufficient to cause auto combustion of even low cetane fuels at compression ratios ranging from 10 to 20:1 and even lower compression ratios when higher cetane fuel such as diesel fuels are used.

In the operation of the preferred embodiment air or other gases which have been introduced into the cylinder through the intake valve are compressed by the upward movement of the piston and thereby forced through the elongated tapered channel of the ignition chamber. As compession continues, the air entering the spherical chamber is not only heated by the compression, but is heated as well by the residual heat retained within the spherical chamber. As previously discussed conductive heat loss from the ignition chamber is reduced as an air gap is provided between the cylindrical housing and the adjacent surfaces of the engine head. Generally, at least 80% of the exterior cylindrical surface of the housing should be in nonconductive relationship to the head.

Due to the tapered or converging configuration of the opening or channel into the ignition chamber, the air and fuel entering therein is accelerated and is directed generally tangentially to the inner walls thereof. In this manner, the air within the spherical chamber follows a substantially circular and nonturbulent flow path.

When the piston is close to the end of its compression stroke which, depending upon the type of engine and the kind of burning chamber, may be anywhere from 6°-25° below top dead center, a fuel is injected under pressures exceeding 1,800 p.s.i. through the injector nozzle. At least a portion of the fuel is injected toward and into the channel leading into the spherical ignition chamber. As the fuel passes through the channel it begins to dissociate and the lighter fuel particles are collected or concentrated within the air moving about the dead air zone. The lighter particles of fuel are subjected to the high temperature within the dead air zone and the combustible mixture is auto ignited. During the initial cranking, additional heat may be provided by a glow plug, however, when the engine reaches operating temperature, the glow plug is disconnected from the power source. As combustion continues within the main combustion chamber, the rapidly expanding gases force the piston downwardly toward the bottom dead center position.

It should be emphasized that it is necessary to have a high enough concentration of fuel in the ignition chamber to provide enough heat upon ignition to compensate for the heat lost through operating at lower compressions and to thereby insure combustion of the remaining fuel in the primary combustion chamber. Additionally, the amount of residual heat within the ignition chambers should be maximized in order to auto ignite the fuel particles which have been separated and concentrated therein due to the centrifugal flow with the ignition chamber. With regard to creating the required air flow, the channel in the preferred embodiment and the openings in the other embodiments should be: Tapered to cause acceleration of particles; tangentially oriented with respect to the inner surface of the ignition chamber; disposed in such a relationship as to create a flow about a single axis through the ignition chamber and be preferably located adjacent the maximum diameter of the ignition chamber so as to insure a continuous dead air zone therethrough; and the total or aggregate of the inner cross-sectional areas of the openings should not exceed generally 5% of the total inner surface area of the ignition chamber.

With the ignition chambers and fuel injections methods used with the present invention, it is possible to reduce the operating compression in cylinders of conventional diesel engines while permitting a variety of fuels to be used including substantially pure commercial grade alcohols such as methanols and ethanols and the like as the sole source of fuel. By permitting engine operation at lower compression ratio, the efficiency of such engines is increased and an increase in fuel economy is achieved.

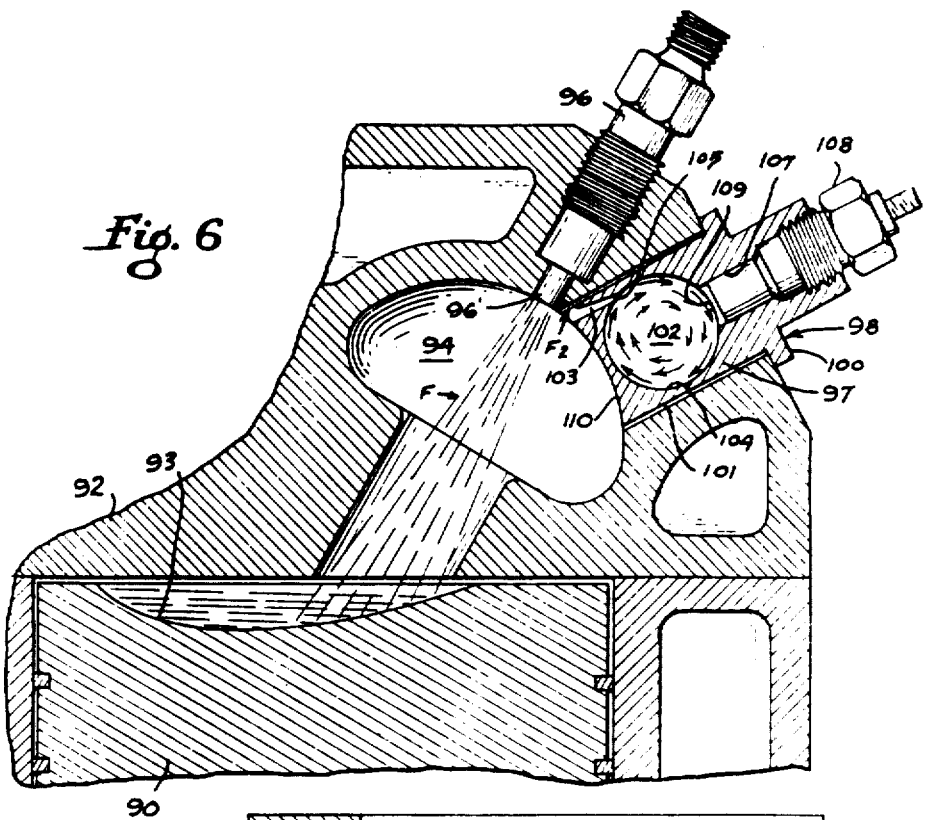
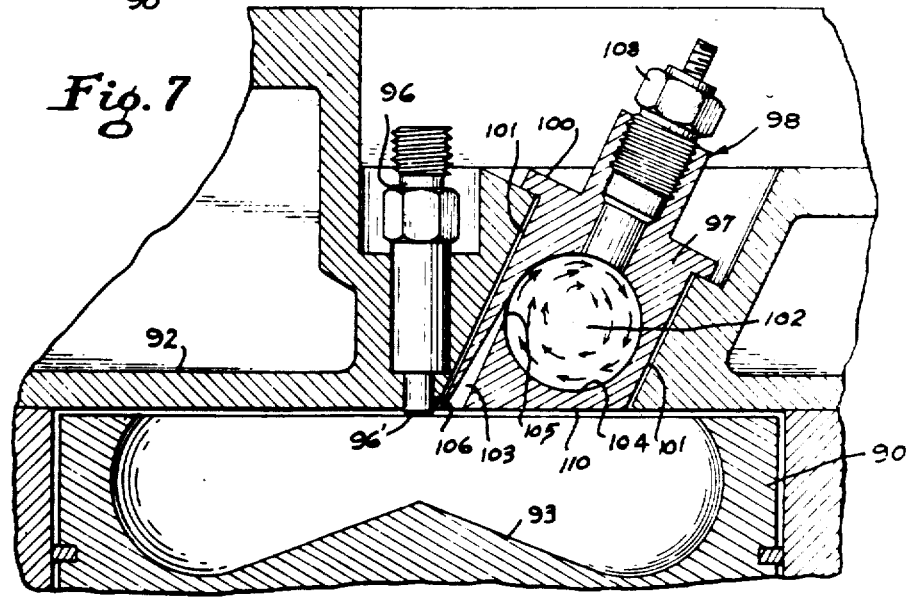

We claim:

1. An ignition chamber for use in internal combustion compression ignition engines comprising a mounting portion and a housing, said housing being generally spherical and extending outwardly from one end of said mounting portion and having inner and outer surfaces, said inner surface of said housing being generally continuous and defining a hollow spherical cavity, said cavity being completely closed except for at least one opening disposed through said housing between said inner and outer surfaces for receiving fuel and air into said cavity, said opening being spaced from said mounting portion and being substantially tangentially oriented with respect to said inner surface of said housing and substantially oriented so as to direct fluid passing therethrough in a uniform manner about a common axis within said cavity, said opening tapering inwardly along its length and said opening providing the only fluid communication into said cavity, and the total of the cross-sectional surface area of said openings taken at said inner surface of said housing not exceeding approximately 5% of the total inner surface area of said cavity.

2. In an internal combustion compression ignition engine having a block and a head, at least one wall defining a cylinder in said block, a piston mounted for reciprocal movement along said cylinder and a combustion chamber, the improvement comprising at least one ignition chamber having a housing defined by inner and outer surfaces, a generally spherical cavity formed within said housing, means for mounting said housing in generally spaced relationship relative to the head so that an air space is created therebetween, at least one opening disposed therein which provides the only fluid communication into said cavity and between said cavity and the combustion chamber, each of said openings being tapered along its length so as to be of reduced cross-sectional dimension adjacent said inner peripheral surface of said side wall and being arranged tangentially with respect to said inner surface of said housing so that fluid entering said housing of said ignition chamber under pressure is accelerated into a circular uniform flow path therein which creates a dead air zone along an axis of said ignition chamber, the cumulative surface area of said openings taken at said inner peripheral surface of said housing not exceeding approximately 5% of the total surface area of said inner peripheral surface of said housing, and injector means, said injector means being mounted exteriorly of and in spaced relationship to said ignition chamber, said injector means directing a first portion of the fuel charge into the combustion chamber and a second portion of the fuel charge into said ignition chamber so that the amount of fuel in said second portion of said fuel charge remains generally constant while said first portion of said fuel charge may vary depending upon engine operating speeds and load conditions.

3. In an internal combustion compression ignition engine having a block and walls defining a head, at least one wall defining a cylinder in said block, a piston mounted for reciprocal movement along said cylinder and a combustion chamber, the improvement comprising an ignition chamber having a mounting portion which is secured to the head of the engine and a housing which extends from said mounting portion toward the combustion chamber, said housing having an end portion remote from said mounting portion, said housing being in spaced relationship from the adjacent walls of the head so as to create an air space therebetween, a generally spherical cavity defined within said housing by arcuate peripheral surfaces, a channel in said housing extending from a first opening adjacent said end portion to a second opening into said cavity, said channel providing the only fluid communication into said cavity and between said cavity and the combustion chamber, said channel being tapered along its length so as to be of reduced cross-sectional dimension at said second opening into said cavity and being arranged tangentially with respect to said inner peripheral surfaces of said cavity so that fluid entering said cavity under pressure is accelerated into a circular uniform flow path about a common axis therein so as to create a dead air zone along said axis, and kinjector means disposed exteriorily with respect to said housing and adjacent to said first opening of said channel, said injector means directing a first portion of the fuel charge toward the combustion chamber and a second portion of the fuel charge into said first opening of said channel.

4. The method of auto igniting fuels at reduced compression ratios in an internal combustion compression ignition engine having a block and a head and a piston reciprocally movable within a cylinder, a combustion chamber, an ignition chamber having a housing with a generally spherical cavity therein mounted to the head so as to create an air space between the housing and the head and in which the housing has at least one opening which communicates the cavity with the combustion chamber and which opening tapers so as to be of a lesser dimension adjacent the cavity including the steps of:
  (a) Compressing air within the cylinder at a ratio of between 7:1 to 20:1,
  (b) Accelerating said compressed air through the opening and into the cavity of the ignition chamber during compression,
  (c) Directing said accelerated air in a uniform circular pattern about a common axis within the cavity to thereby create a dead air zone centrally thereof wherein elevated temperatures are maintained,
  (d) Injecting a first variable portion of a fuel charge into the combustion chamber at a period close to the end of the compression stroke, and simultaneously directing a second generally constant portion of said fuel charge toward and through the opening and into the cavity of the ignition chamber to thereby entrain said second portion with said accelerated air within the cavity and collecting the lighter particles being dissociated from said second portion of said fuel charge within the cavity, and
  (e) Igniting the collected lighter particles within the cavity in the ignition chamber by the heat therein to thereby releasing additional heat which initiates combustion of said first portion of said fuel charge within the combustion chamber.

5. An ignition chamber for use in internal combustion compression ignition engines having a combustion chamber with a fuel injector mounted therein spaced from said ignition chamber and comprising a housing having a mounting portion and a body portion, said body portion having an end portion spaced from said mounting portion, a cavity formed internally of said body, said cavity being generally spherically shaped and substantially enclosed by generally smooth and continuous inner walls, at least one passageway extending from a first opening adjacent said end portion of said body to a second opening into said cavity, said first opening being spaced remotely from said mounting portion, said passageway being tapered along its length so as to be of lesser cross-sectional dimension adjacent said second opening than said first opening and further providing the only fluid communication into said cavity, so that fuel injected by said fuel injector is received into said cavity through said first and second opening, said second opening of said passageway being oriented tangentially with respect to said inner walls of said cavity and being oriented to direct any fluid passing therethrough in a circular path about a common axis, and the cross-sectional surface area of said second openings being not greater than approximately 5% of the total inner surface area of said cavity.

6. The invention of claim 1 including a plurality of openings, each of said openings through said housing being tapered so as to be reduced in cross section from said outer surface to said inner surface of said housing.

7. The invention of claim 6 in which said inner and outer surfaces include generally arcuately shaped peripheral portions which define a maximum diameter of said housing, and said openings being disposed in spaced relationship about said housing generally along the plane defining said maximum diameter of said housing.

8. The invention of claim 7 in which said openings through said housing are disposed in at least two parallel planes.

9. The invention of claim 7 in which said openings are substantially equally spaced with respect to one another.

10. The invention of claim 2, including a plurality of said openings, said openings being disposed in substantially equally spaced relationship along a plane adjacent the maximum diameter of said cavity.

11. The invention of claim 2 in which at least approximately 80% of said outer surface of said housing is in convective heat relationship with the combustion chamber.

12. The invention of claim 11 in which said means for mounting said housing includes a base portion which is mounted to the head and extends outwardly therefrom.

13. The invention of claim 11 in which said means for mounting said housing includes a base portion which is mounted to the piston and extends outwardly therefrom.

14. The invention of claim 11 in which the combustion chamber includes an auxiliary combustion chamber and wherein said ignition chamber is mounted within said auxiliary combustion chamber.

15. The invention of claim 3 in which said cross-sectional area of said second opening of said channel into said cavity does not exceed approximately 5% of the total inner peripheral surface area of said cavity.

16. The invention of claim 15 in which said cavity in said housing defines a total volume of between 1% to 20% of the volume defined by the combustion chamber.

17. The invention of claim 16 in which the amount of fuel in said second portion of said fuel charge is generally constant while said first portion of said fuel charge may vary depending upon engine operating speeds and load conditions and said volume of said cavity is increased as the compression ratio of the engine is decreased and is decreased as the engine compression ratio is increased.

18. The method of claim 4 in which the amount of fuel in said second portion of said fuel charge is sufficient to insure that at least 80% of the available oxygen in said air within the cavity of the ignition chamber is consumed during each combustion.

19. The method of claim 18 in which air is compressed at engine operating compression ratios of between 10:1 and 20:1 and said fuel is a substantially pure commercial grade alcohol.

20. The method of claim 18 in which the air is compressed at engine operating compression ratios of between 7:1 to 14:1 and said fuel is selected from one of the group consisting of a standard diesel fuel, gasoline, kerosene and mixtures thereof.

21. The ignition chamber of claim 5 including a supplemental heat source means disposed through said body portion of said housing, said supplemental heat source means being generally aligned with said inner walls defining said cavity so as not to project inwardly of said cavity.

* * * * *

UNITED STATES PATENT AND TRADEMARK OFFICE
CERTIFICATE OF CORRECTION

PATENT NO. : 4,444,166
DATED : April 24, 1984
INVENTOR(S) : Geza Kovacs, et al

It is certified that error appears in the above-identified patent and that said Letters Patent is hereby corrected as shown below:

Insert Figs. 6 and 7 as shown on the attached sheet as part of Letters Patent.

Signed and Sealed this

Eleventh Day of September 1984

[SEAL]

Attest:

GERALD J. MOSSINGHOFF

Attesting Officer    Commissioner of Patents and Trademarks